United States Patent
Razgunas et al.

(10) Patent No.: US 6,213,541 B1
(45) Date of Patent: Apr. 10, 2001

(54) COWL ASSEMBLY

(75) Inventors: Paul S. Razgunas, Canton; Donald A. Surhigh, Sterling Heights; Michael F. Pickholz, Oxford, all of MI (US)

(73) Assignee: Textron Automotive Company, Dover, NH (US)

( * ) Notice: Subject to any disclaimer, the term of this patent is extended or adjusted under 35 U.S.C. 154(b) by 0 days.

(21) Appl. No.: 09/378,381

(22) Filed: Aug. 20, 1999

(51) Int. Cl.⁷ .......................................................... B60J 7/00
(52) U.S. Cl. ............................................. 296/192; 296/194
(58) Field of Search .................................. 296/192, 194, 296/203.02

(56) References Cited

U.S. PATENT DOCUMENTS

| | | |
|---|---|---|
| 2,963,315 | 12/1960 | Wilsdorf, Sr. . |
| 4,159,843 | 7/1979 | Crossman . |
| 4,332,187 | 6/1982 | Imai . |
| 4,391,465 | * 7/1983 | Piano ..................................... 296/208 |
| 4,679,845 | 7/1987 | Detampel . |
| 4,936,599 | 6/1990 | McNamee . |
| 5,061,009 | 10/1991 | Harasaki . |
| 5,108,146 | 4/1992 | Sheppard . |
| 5,358,300 | * 10/1994 | Gray ....................................... 296/192 |
| 5,451,090 | * 9/1995 | Brodie et al. ......................... 296/192 |
| 5,553,912 | 9/1996 | Kubina . |

FOREIGN PATENT DOCUMENTS

| | | | |
|---|---|---|---|
| 4052-278635 | * 10/1993 | (JP) ....................................... 296/192 |
| 004232846 | * 3/1994 | (JP) ....................................... 296/192 |

* cited by examiner

*Primary Examiner*—D. Glenn Dayoan
*Assistant Examiner*—Mickki D. Murray
(74) *Attorney, Agent, or Firm*—Reising, Ethington, Barnes, Kisselle, Learman & McCulloch PC

(57) ABSTRACT

A cowl assembly for a vehicle and its method of assembly includes providing first and second separable cowl parts 34, 36 adjustable between connection points on the vehicle and a latch mechanism 38 connects the first and second cowl parts for handling as a unit and for lateral adjustment of the length of the unit; and the first and second cowl parts respectively including first and second portions 62, 66 thereon configured to engage one another to providing relative movement between said first and second cowl parts for actuating the latch mechanism between locked and released positions in response to lateral adjustment of the cowl parts for connection to the vehicle.

5 Claims, 4 Drawing Sheets

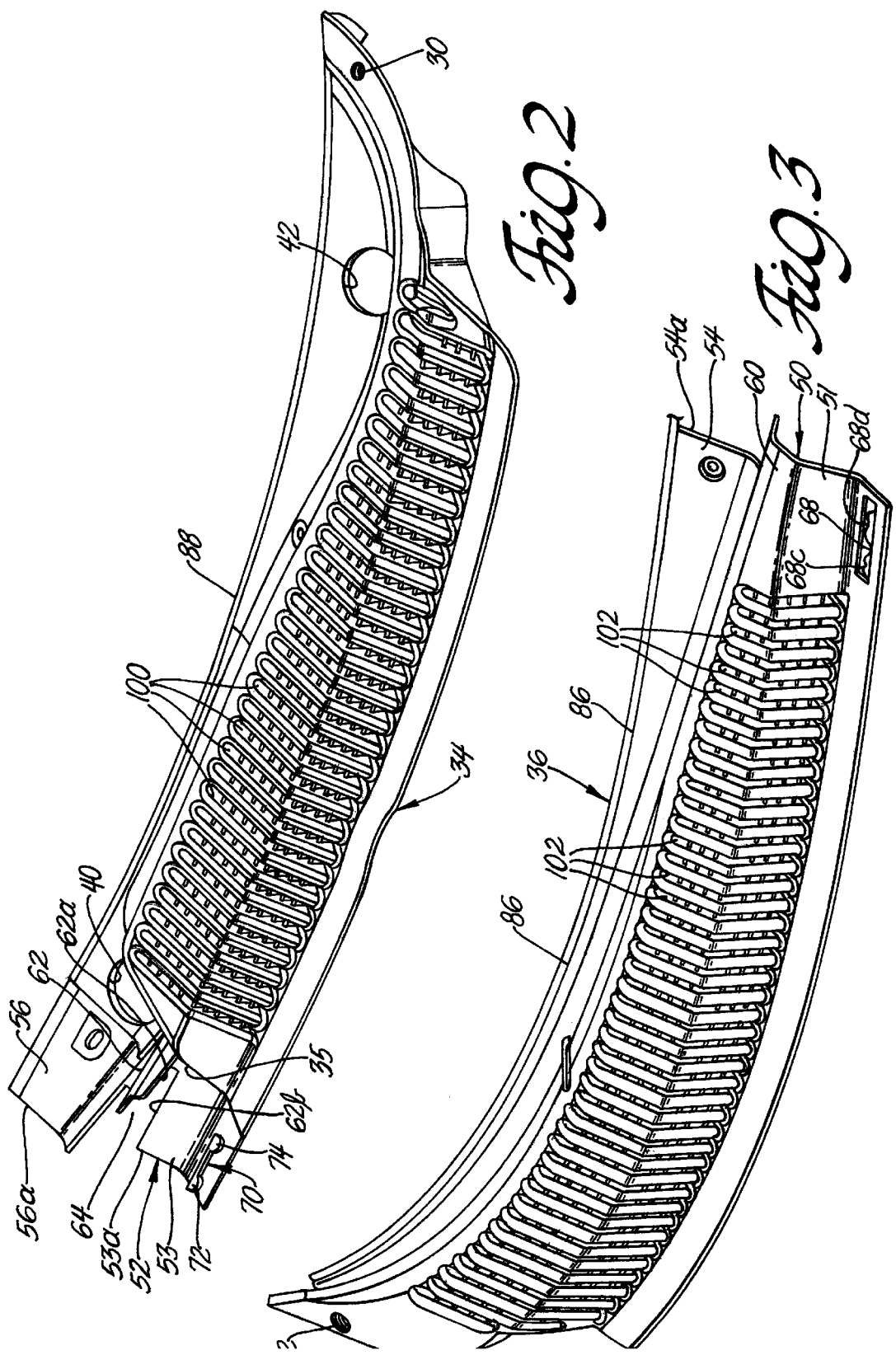

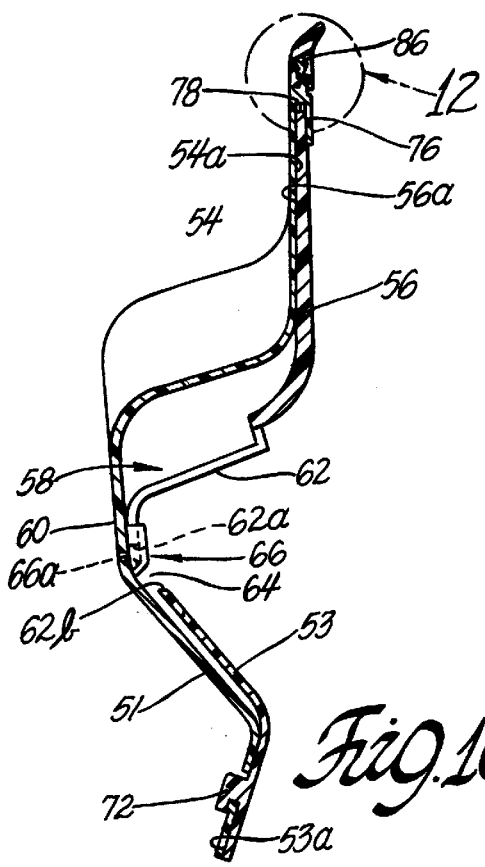
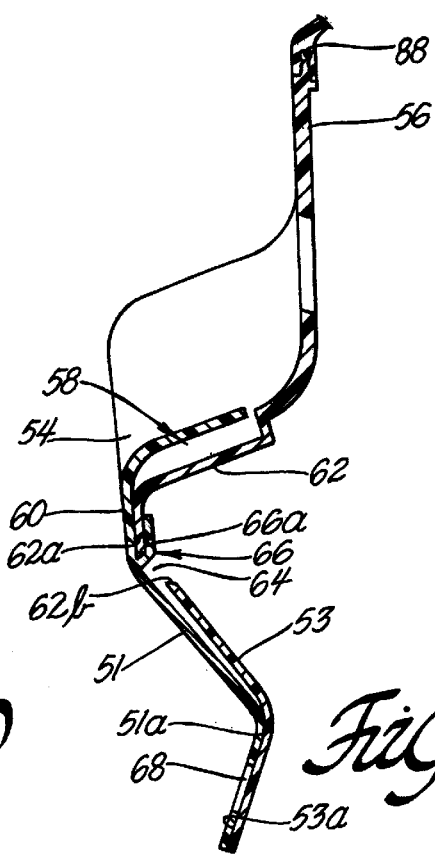
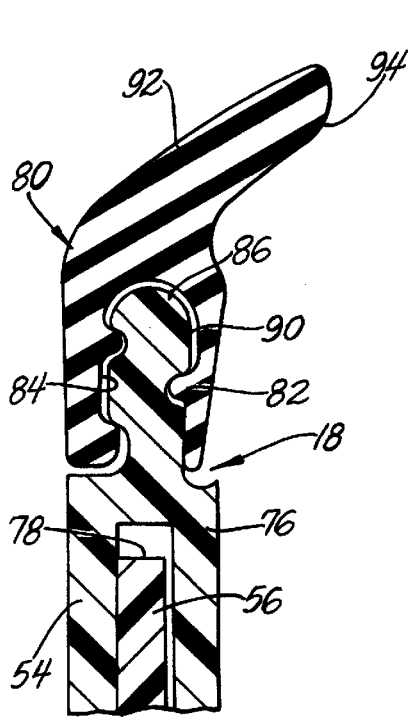
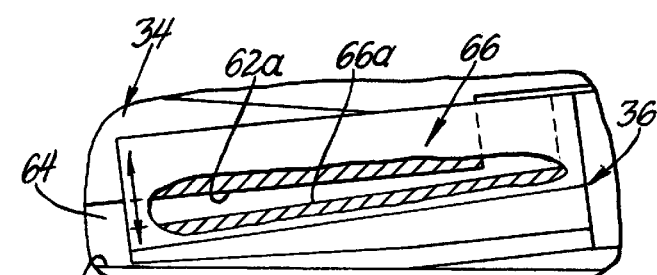
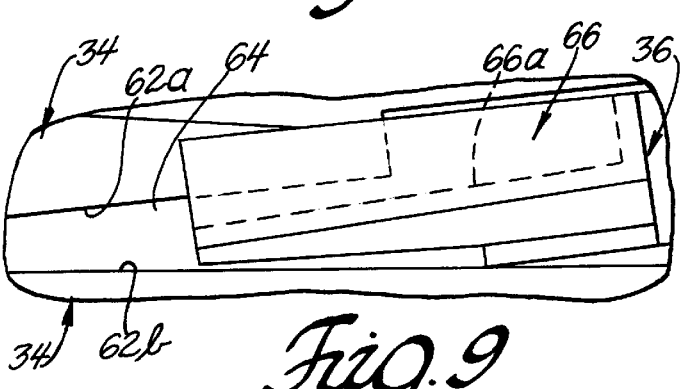

COWL ASSEMBLY

TECHNICAL FIELD

This invention relates to vehicle ventilation systems and more particularly to cowl assemblies that may provide an inlet to the HVAC system of a motor vehicle and more particularly to such assemblies that are adjustable in length for ease of connection to laterally spaced vehicle body connection points and their method of assembly.

BACKGROUND PRIOR ART

Two piece cowl grills such as disclosed in U.S. Pat. No. 4,679,845 are connected at a tongue and groove connection that is adjustable to change the length of the cowl so as take into consideration differences in the lateral distance between connection points on a vehicle resulting from manufacturing tolerances. While suitable for its intended purpose the cowl arrangement in the '845 patent depends upon a groove shaped elastomeric seal that fits around the lower edge of a windshield to seal the gap between the cowl and the windshield. The groove shaped seal provides a friction-type lock against lateral shifting between the windshield and the cowl after the cowl has been connected to the vehicle and the windshield has been installed to the cowl. While suitable for use on windshield arrangements that require a bottom edge seal it lacks the flexibility of positioning required in windshield/cowl gap seal systems wherein the gap is sealed by a seal element that includes a flap that seals against the windshield at a point above the lower edge thereof.

SUMMARY OF THE INVENTION

An object of the present invention is to provide a two part cowl arrangement that is laterally adjustable and that is locked together for handling and releasable for connection between varying distances on laterally spaced connection points on a vehicle and wherein the lock release is controlled by lateral movement of the two cowl parts.

Yet another object of the present invention is to provide such lock action and such release for adjustment by a latch mechanism for that releasably connects first and second cowl parts for handling as a unit and for lateral adjustment there between and wherein said first and second cowl parts respectively have first and second portions thereon configured to provide a slip joint there between; the first and second portions engaging one another at edge portions thereon to providing transverse movement between the first and second cowl parts for actuating the latch mechanism between locked and released positions in response to lateral adjustment there between.

Another object of the present invention is to provide a two part cowl arrangement that is laterally adjustable and that is locked together for handling and releasable for connection between varying distances on laterally spaced connection points on a vehicle and wherein the lock release is controlled by lateral movement of the two cowl parts and in which the first and second cowl parts have an edge segment thereon and a seal member carried by said edge segment has a sealing flap thereon configured to seal against the outer surface of a windshield at a point above the lower edge of the windshield.

Another object of the present invention is to provide a two part cowl arrangement that is laterally adjustable and that is locked together for handling and releasable for connection between varying distances on laterally spaced connection points on a vehicle and wherein the lock release is controlled by lateral movement of the two cowl parts and the latch mechanism includes a slot on one of said first and second cowl parts and a releasable lock member on the other of said first and second cowl parts.

Still another object of the present invention is to provide an arrangement as set forth in the preceding object wherein the slot has first and second indexed locations thereon for positioning said lock at maximum and minimum adjusted positions of the slip joint.

Still another feature of the present invention is to provide for such a latch mechanism wherein the indexed locations are selectively engaged by a releasable lock member formed as spaced L-shaped parts.

Another object of the present invention is to provide a two part cowl arrangement that is laterally adjustable and that is locked together for handling and releasable for connection between varying distances on laterally spaced connection points on a vehicle and wherein the first and second cowl parts respectively have first and second portions thereon configured to provide a slip joint there between. The slip joint has first and second edges thereon and a driver member is angularly disposed between the first and second parallel edges and engageable with one of the edges to move the tracks apart upon lateral adjustment of the first and second cowl parts to force the cowl parts in a direction to actuate the latch mechanism to a locked position for interconnecting the first and second cowl parts for handling and positioning as a unit; the angularly disposed position selected to permit lateral release of said latch mechanism for adjusting the end to end length of said cowl prior to connection thereof between laterally spaced points on a vehicle body.

A still further object of the present invention is to provide a two part cowl arrangement that is laterally adjustable and that is locked together for handling and releasable for connection between varying distances on laterally spaced connection points on a vehicle and wherein the cowl parts have an edge segment to slidably receive a seal member for allowing lateral adjustment of said first and second cowl parts while said seal member is supported on said edge segment.

Another feature of the present invention is to provide such a slidable seal as in the preceding object wherein the seal member has a first end connected to the edge segment and a second end engageable with the windshield; the first and second ends formed from elastomeric material having a greater hardness at the first end than at the second end.

A still further object of the invention is to provide a method for assembling a cowl on a vehicle body for supporting a seal member thereon in sealing engagement with a windshield including providing a first cowl part having an end portion thereon configured to be connected to a first body member; providing a second cowl part having an end portion thereon configured to be connected to a second body member spaced laterally from said first body member; providing a latch between the first and second cowl parts to prevent separation thereof and to allow lateral adjustment thereof; providing a slip joint between said first and second cowl parts operable to release and lock the latch; operating the slip joint to release the latch; adjusting the length of the slip joint when the latch is released for locating the first and second cowl parts whereby the end portions thereon are aligned with the first and second body parts respectively; and interconnecting the end portions to the first and second body parts for securing the first and second cowl parts in place on a vehicle without separating the slip joint there between.

A feature of the method of the present invention is to latch the first and second cowl parts with L-shaped locks.

A further feature of the method of the present invention is to locate a seal member on the cowl parts prior to lateral adjustment thereof.

A still further feature of the method of the present invention is to provide an edge segment on the first and second cowl parts and supporting a seal member on the edge segment that is relatively slidable on the edge segment during lateral adjustment of the cowl parts. Yet another feature of the method of the present invention is to provide a seal member that has a hard end and a soft end and connecting the hard end of the seal member to the cowl parts.

These and other objects, features and advantages of the present invention will become more apparent when reference is made to the following drawings and the accompanying description.

BRIEF DESCRIPTION OF THE INVENTION

FIG. 2 is a perspective view of a right hand part of the cowl assembly;

FIG. 3 is a perspective view of a left hand part of the cowl assembly;

FIG. 8 is an enlarged fragmentary rear view of a slip joint shown when the latch is in the locked position of FIG. 6;

FIG. 9 is a view like FIG. 8 showing the slip joint when the latch is released;

FIG. 10 is an enlarged sectional view taken along the line 10—10 of FIG. 4 looking in the direction of the arrows;

FIG. 11 is an enlarged sectional view taken along the line 11—11 of FIG. 4 looking in the direction of the arrows; and FIG. 12 is an enlarged view of circled section 12 in FIG. 10.

BEST MODE FOR CARRYING OUT THE INVENTION

Figure 1:
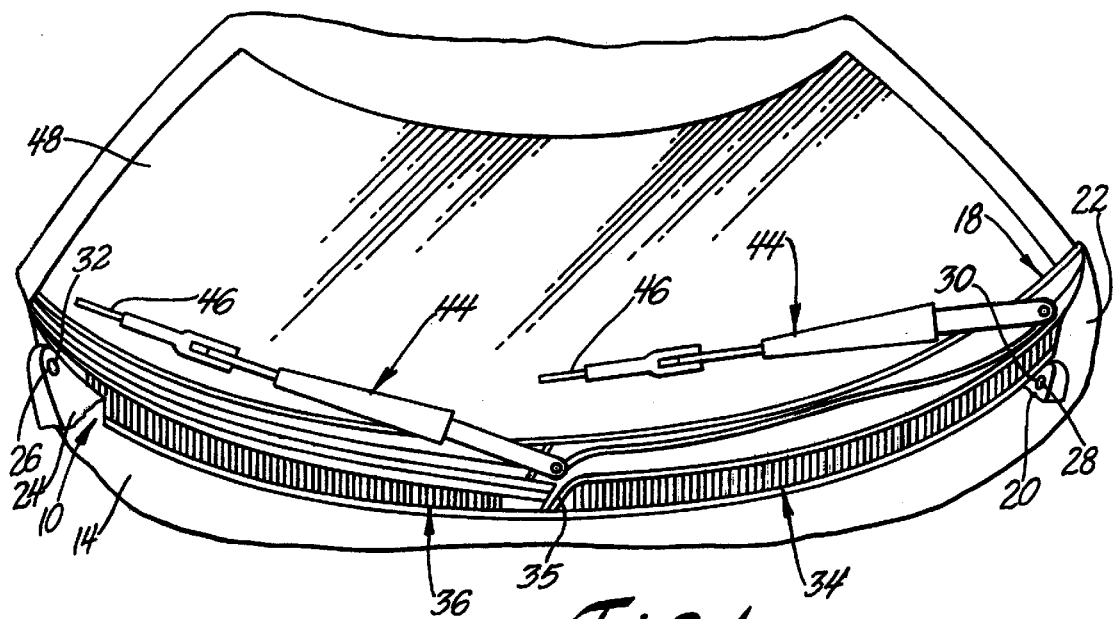
FIG. 1 is a fragmentary perspective view of a vehicle embodying the cowl assembly of the present invention.

FIG. 1 illustrates a vehicle cowl assembly 10 located between a windshield 12 and a hood 14 of a motor vehicle 16. The cowl assembly 10 carries a seal unit 18 that is configured to seal a gap between the cowl assembly 10 and the windshield 12 above a fire wall 20. A pair of laterally spaced supports or connection points 22, 24 are provided on a vehicle part, e.g., the right and left vehicle fenders, for connection to opposite ends 26, 28 of the cowl assembly 10 by suitable fasteners such as plug nuts 30, 32 or other suitable fasteners depending upon the type selected by the manufacturer that is practicing the method of the present invention to apply the cowl assembly and seal unit of the present invention for its intended industrial application.

More specifically, the vehicle cowl assembly 10 includes first and second separable cowl parts 34, 36 laterally adjustable between the connection points 22, 24 on the vehicle at a breakline 35 therebetween. The cowl parts 34, 36 are joined by a latch mechanism 38 for releasably connecting the first and second cowl parts 34, 36 for handling as a unit and for lateral adjustment there between. The first cowl part includes openings 40, 42 through which dual wiper arms 44 and blades 46 are reciprocally pivotally mounted on the cowl part 34 for wiping the outer surface 48 of the windshield 12.

As shown in FIGS. 2 and 3, the first and second cowl parts 34, 36 respectively, have first and second inboard portions 50, 52 thereon configured with lower segments 51, 53 to be overlapped. As best shown in FIGS. 10 and 11 the lower segments 51, 53 are shown following being overlapped. The cowl parts 34, 36 also have upper segments 54, 56 as shown in FIGS. 2 and 3. When overlapped, the lower segments 51, 53 and upper segments define a slip joint 58 between the cowl parts 34, 36 as shown in FIGS. 10 and 11. The first and second portions 50, 52 at the lower segments 51, 53 have opposed surfaces 51a, 53a engaging one another and at the upper segments 54, 56 have opposed surfaces 54a, 56a providing relative movement between said first and second cowl parts 34, 36. Response to lateral adjustment there between as will be described more specifically with reference to the detailed description of the latch mechanism 38.

Figure 4:
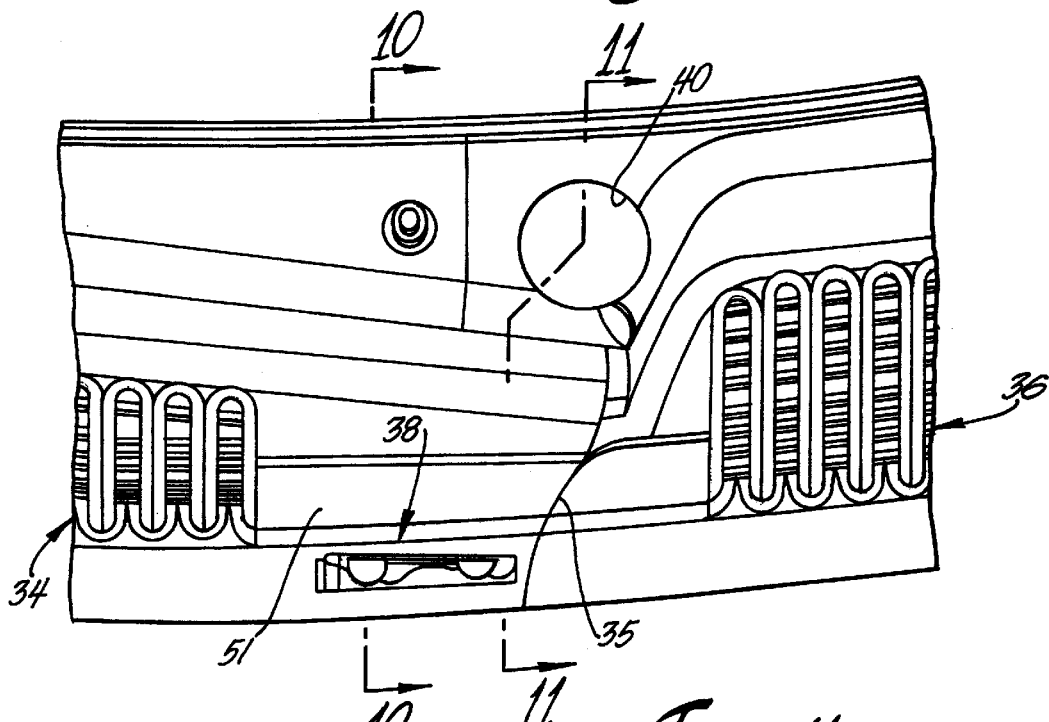
FIG. 4 is an enlarged fragmentary top elevational view of a latch mechanism for locking the right and left hand parts together for handling shown in a locked position.

Additionally, the first and second inboard portions 50, 52 include intermediate segments 60, 62. The intermediate segment 62 has first and second tracks or edges 62a, 62b thereon spaced from one another to form a slot 64. The intermediate segment 60 on the first inboard portion 50 carries a driver member 66 shown in FIGS. 8 and 9. The driver member 66 is formed as an integral hook on segment 60 that overlaps the edge 62a. The driver member has an inner surface 66a that is angularly disposed between said first and second tracks 62a, 62b at an angle less than 10° C. with respect to the edge 62a so as to cause the intermediate segments 60, 62 to move apart transversely to the length of the cowl assembly 10 upon lateral adjustment of said first and second cowl parts. Such movement forces the latch mechanism 38 to a locked position for interconnecting said first and second cowl parts for handling and positioning as a unit as best shown in FIG. 4. The reduced draft angle of 10° or less is selected to permit easy lateral release of the latch mechanism 38 for adjusting the end to end length of said cowl prior to connection thereof between laterally spaced connection points on a vehicle body.

Figure 7:
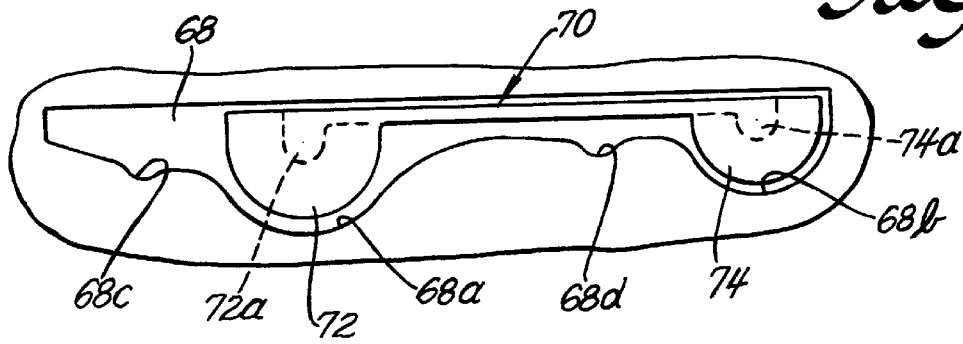
FIG. 7 is a view like FIG. 6 in a released position.

The latch mechanism 38 includes a slot 68 on the inboard portion 50 of the first cowl part 32 and a releasable lock member 70 on the inboard portion 52 of the second cowl part 34. The lock member 70, more particularly includes spaced L-shaped hooks 72, 74 that are selectively positioned in the slot 68 to be forced into and out of laterally spaced indexing detents 68a, 68b therein. The hooks 72, 74 fit through the slot 68 such that they hold the inboard portion 50 against the inboard portion 52. As best shown in FIG. 7, the slot 68 includes two spaced segments 68a, 68b configured for insertion of the hooks 72, 74 through the slot 68 so as to be able to hook over the outer surface of the inboard portion 50 at the lower segment 51 thereof. Additionally, the slot 68 includes two indexing surfaces 68c, 68d thereon.

Depending upon a particular application the length of the slot 68 and the position of the offset indexing surfaces 68c, 68d will receive hook segments 72a, 74a of the hooks 72, 74 that will slide in slot 68 as the length of the assembly is adjusted, if required.

During handling as a unit and during adjustment, the upper part of the slip joint 58 is held together by trapezoidally shaped guide flange 76 on the upper segment 54 that overlaps the upper edge 78 of the upper segment 56 as best shown in FIG. 12.

In operation, to join the first and second cowl parts 32, 34 the flange 76 and driver member 66, respectively, are slipped axially onto the edges 78, 62a and the hooks 72, 74 are inserted through the slot segments 68a, 68b and moved to a closed or locked position in which the hooks 72, 74 are seated in the detents 68c, 68d. The joined parts 32, 34 are thus interlocked so that the cowl assembly 10 can be handled as a unit as it is being located on a vehicle body in preparation for lateral adjustment between spaced connection points on the vehicle body.

Figure 5:
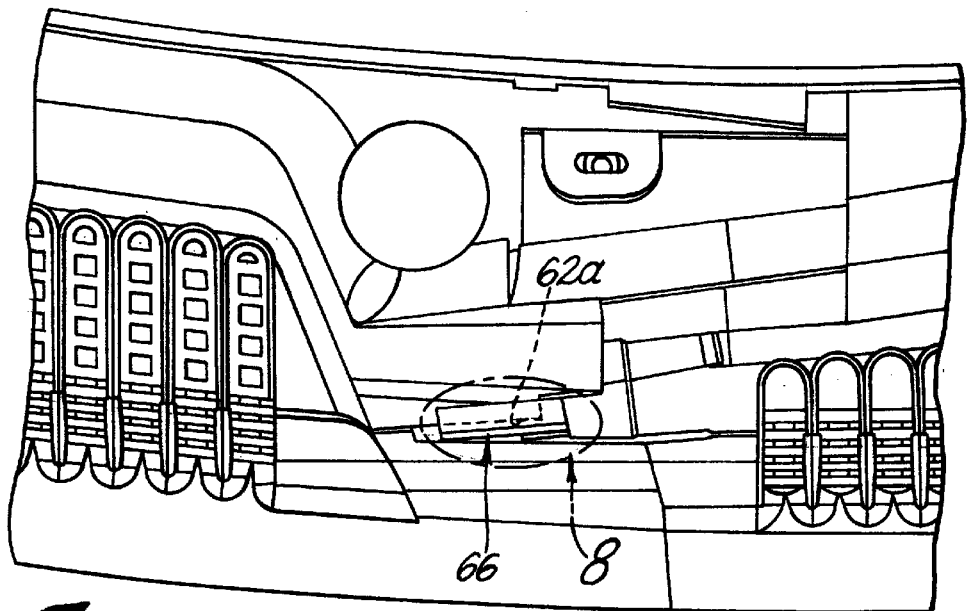
FIG. 5 is an enlarged fragmentary rear view of a slip joint formed in the locked together parts in FIG. 4.
Figure 6:
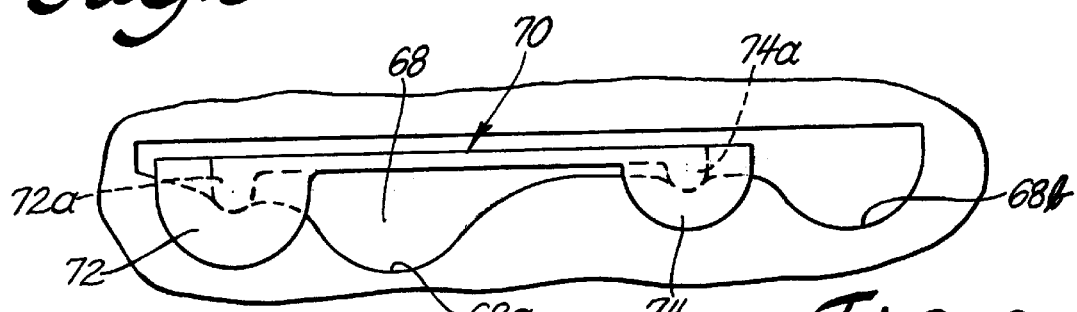
FIG. 6 is an enlarged fragmentary top elevational view of the latch mechanism of FIG. 4 shown in a locked position.

The hooks 72 are initially in the detents 68c, 68d (as shown in FIG. 5) when the cowl 10 assembly is being handled as a unit. Once the cowl assembly 10 is positioned on a vehicle for connection to connection points located on the vehicle body the driver member 66 is forced from its locked position and the cowl parts 34, 36 are separated until the ends thereof are directly over the connection points and the fasteners are connected.

A further feature of the present invention (shown in FIG. 12) is the provision of a seal unit 18 that includes an elastomeric seal 80 having a base 82 thereon with a groove 84 therein into which is inserted a seal retention edges 86, 88 on the cowl parts 34, 36 at a point on the rear edges thereof The retention edges 86, 88 extend along the cowl assembly and have an outer surface 90 configured to conform to the groove 84 so as to interlock the base 82 in place. The elastomeric seal 80 is a coextruded seal having a base 82 of a semi-rigid strip of polypropylene. The seal 80 further includes a coextruded lip 92 that is configured as a flap having greater flexibility or elasticity than that of the semi-rigid base strip. The flap 92 overlies the outer surface of the windshield so that its inner surface 94 engages the windshield in sealing engagement therewith. The arrangement enables the seal to be easily assembled with respect to the windshield to compensate for tolerance differences between the cowl assembly 10; seal unit 18 and bottom edge of the windshield. In one working embodiment, the seal member base has a Shore A durometer of 80 and the coextruded lip 92 has a Shore A durometer of 60. Such a durometer of the seal base member balances the flexibility sought for a seal with the rigidity necessary to insure proper interlock of the base in place. Other durometers may also be suitable.

One feature of the invention is that the seal 80 is received on the outer surface 90 of the retention edges 86, 88 so that it can slide along the length of the surface such that the seal member 80 will slip slightly with respect to the edges 86, 88 for allowing lateral adjustment of said first and second cowl parts while said seal member is supported on said edge segment.

Another aspect of the invention is to provide an improved method for assembling the cowl on a vehicle body adjacent a windshield such as shown at 12 in FIG. 1. The method includes:

providing a first cowl part 34 having an end portion 26 thereon configured to be connected to a first body member 22;

providing a second cowl part 36 having an end portion 28 thereon configured to be connected to a second body member 24 spaced laterally from said first body member, providing a latch 38 between the first and second cowl parts to prevent separation thereof and to allow lateral adjustment thereof;

providing a slip joint 58 between the first and second cowl parts operable to release and lock the latch;

operating the slip joint to release the latch;

adjusting the length of said slip joint when the latch is released whereby said end portions thereon are aligned with the first and second body parts respectively; and interconnecting the end portions to the first and second body parts for securing the first and second cowl parts in place on a vehicle without separating the slip joint there between.

In one method the latch is configured to include spaced L-shaped locks.

In another method the cowl parts are connected to a seal member that extends along the fill length of the joined cowl parts prior to laterally adjusting the length of the joined cowl parts.

In another method the cowl parts support a seal member that is able to slip with respect to the cowl parts during lateral adjustment thereof.

INDUSTRIAL APPLICABILITY

It should be apparent that the invention provides a self-contained easily assembled cowl assembly adaptable to a wide variety of windshield configurations for sealing a cowl to a windshield by a seal unit that will adjust with the application while providing a tight seal to the windshield of a vehicle. The cowl assembly can be a filler piece for closing the space between the windshield, the hood and fenders of a vehicle. The cowl assembly can also, if desired be part of an HVAC unit by including inlet openings 100, 102 therein for the passage of inlet air to the HVAC unit. The cowl assembly is adaptable to any vehicle having body panels spaced from a windshield.

The embodiments of the invention in which an exclusive property or privilege is claimed are as follows:

What is claimed is:

1. A vehicle body ventilation system having a cowl; a seal member for sealing the cowl to a windshield and laterally spaced connection points on a vehicle for supporting the cowl on the vehicle; the cowl having first and second cowl parts adjustable between the connection points on the vehicle said first and second cowl parts characterized by:

a latch mechanism including a pair of hooks on said first cowl part; a first slot in said second cowl part; said first slot having spaced segments through which said hooks can be inserted; said hooks moveable within said first slot when said first and second cowl parts are moved together so as to cause said hooks to hook over the outer surface of said second cowl part in a lock position for holding said first and second cowl parts together; a driver member on said first cowl part; a second slot in said second cowl part defined in part by an edge on said second cowl part; said driver being received within said second slot and engageable with said edge on said second cowl part to cause said first and second cowl parts to be moved so as to lock said hooks against said second cowl part at said first slot.

2. The vehicle body ventilation system of claim 1 further characterized by: said first slot having first and second indents defining indexed locations thereon; said hooks having segments thereon configured to be seated in said detents when said hooks are in their lock position.

3. The vehicle body ventilation system of claim 1 characterized by: said driver member having a surface thereon angled with respect to said edge on said second cowl part and engageable therewith as said first and second cowl parts are moved together for locating said hooks against said detents for interconnecting said first and second cowl parts for handling and positioning as a unit; said said surface and said edge angled to permit lateral release of said latch mechanism for adjusting the end to end length of said cowl prior to connection thereof between laterally spaced points on a vehicle body.

4. The vehicle body ventilation system of claim 3 characterized by: said surface on said driver member formed at an angle less than 10° with respect to said edge.

5. A method for assembling a two part cowl on a vehicle body having first and second connection points characterized by:

providing a first cowl part having an end portion thereon configured to be connected to a first connection point on a vehicle body;

providing a second cowl part having an end portion thereon configured to be connected to a second connection point on the vehicle body spaced laterally from said first connection point;

providing a pair of hooks on said first cowl part;

providing on said second cowl part a first slot having spaced segments through which said hooks can be inserted;

providing on said first cowl part a second slot defined in part by an edge;

providing a driver configured to fit in said second slot;

inserting said hooks through said spaced segments of said first slot;

moving said hooks within said slot when said first and second cowl parts are moved together in a transverse direction so as to cause said hooks to hook over the outer surface of said second cowl part for locking said first and second cowl parts together;

positioning said driver within said second slot when said first and second cowl parts are moved together in a transverse direction and engaging said driver with said edge to cause said hooks to seat against said second cowl part;

moving the hooks away from the second cowl part by adjusting the length of said cowl by moving the first and second cowl parts apart;

aligning the end portions on the first and second cowl parts when aligned with the first and second connection points respectively; and interconnecting said end portions to said first and second connection points for securing said first and second cowl parts in place on a vehicle.

\* \* \* \* \*